United States Patent [19]
Gonze et al.

[11] Patent Number: 5,314,708
[45] Date of Patent: May 24, 1994

[54] PROCESS FOR THE PRODUCTION OF HARD CANDY

[75] Inventors: Michel H. A. Gonze, Bruxelles; Freddy M. L. Van der Schueren, Aalst; André L. I. Rapille, Knokke-Heist, all of Belgium

[73] Assignee: Cerestar Holding B.V., Belgium

[21] Appl. No.: 924,963

[22] Filed: Aug. 5, 1992

[30] Foreign Application Priority Data

Aug. 15, 1991 [GB] United Kingdom ............... 9117617

[51] Int. Cl.⁵ .................................... A23G 3/00
[52] U.S. Cl. ............................. 426/660; 426/804
[58] Field of Search ............ 426/660, 548, 658, 804

[56] References Cited

U.S. PATENT DOCUMENTS

| | | | |
|---|---|---|---|
| 4,154,867 | 5/1979 | Aldrich et al. | 426/660 |
| 4,497,846 | 2/1985 | Boursier et al. | 426/660 |
| 4,883,685 | 11/1989 | Kondou | 426/660 |
| 5,017,400 | 5/1991 | Olinger et al. | 426/660 |
| 5,223,303 | 6/1993 | Taskinen | 426/660 |

FOREIGN PATENT DOCUMENTS

| | | |
|---|---|---|
| 0094292 | 4/1983 | European Pat. Off. . |
| 0303295 | 2/1989 | European Pat. Off. . |
| 2038832 | 12/1978 | United Kingdom . |

OTHER PUBLICATIONS

Grenby, "Developments in Sweeteners-3" pp. 83-108 (1987).
European Search Report.

*Primary Examiner*—Jeanette Hunter
*Attorney, Agent, or Firm*—Cushman, Darby & Cushman

[57] ABSTRACT

A process for the production of hard candy comprises heating a maltitol-containing mixture of sugar alcohols at an elevated temperature in which the maltitol content of the sugar alcohol mixture is more than 77% but less than 86% by weight preferably 82 to 84% by weight based on dry substance and the elevated temperature is preferably 150° to 158° C.

17 Claims, No Drawings

PROCESS FOR THE PRODUCTION OF HARD CANDY

The present invention relates to the production of hard candy, in particular to a hard candy which is produced from maltitol.

Hard candy is a confectionary which is made from a sugar and is characterised by the sugar being present in the amorphous state as a highly supercooled liquid which gives the product a shiny, glassy appearance. The sugars which are used in the production of hard candies are conventionally sucrose and the so-called corn syrups which are starch hydrolysates containing varying amounts of glucose, maltose and higher polysaccharides. The production process involves heating the sugar or mixture of sugars together with any flavouring and colouring agents at an elevated temperature optionally under reduced pressure either in a batch or continuous cooker. The cooled product has to be wrapped or kept in an air-tight container to prevent moisture pick-up by the candy under conditions of high humidity.

Recent developments in hard candy manufacture have seen the replacement of part or all of the sugar by a sugar alcohol in the interest of providing a product having a reduced calorie content and a lower tendency to cause tooth decay. One sugar alcohol in particular which has been proposed for the manufacture of hard candy is maltitol either alone or in polyol mixtures containing maltitol.

For example the book "Developments in Sweeteners—3" edited by T. H. Grenby and published by Elsevier Applied Science contains a chapter by I. Fabry entitled "MALBIT and its Applications in the Food Industry" from pages 83 to 108, in which, at pages 93 to 97 there is described the use of MALBIT (crystalline) containing 86 to 90% maltitol and MALBIT (liquid) containing 73 to 77% maltitol, in the manufacture of hard candy. MALBIT is the trademark used to designate these maltitol-based sweeteners. Another description of the use of maltitol to make hard candy is found in U.K. patent 2 038 832 where, in Example 1, hard candies are described as being made from an hydrogenated starch hydrolysate containing 51.5% maltitol.

Two important properties which are required of a hard candy are clarity or transparency and a minimal tendency to pick up water from the air and become sticky. We have found that for hard candies based on maltitol the optimum composition to use is a sugar alcohol mixture in which the maltitol content is intermediate that of MALBIT (crystalline) and MALBIT (liquid) i.e. more than 77% maltitol but less than 86% maltitol the preferred composition containing 82 to 83% maltitol.

Accordingly, the invention is a process for the production of a hard candy by heating a maltitol-containing mixture of sugar alcohols at an elevated temperature which is characterised in that the maltitol content of the sugar alcohol mixture is more than 77% but less than 86% by weight based on dry substance.

Preferably the maltitol content of the sugar alcohol mixture is 80 to 85% more preferably 82 to 84% e.g. 82 to 83% by weight based on dry substance. When the mixture contains 77% or less maltitol the resultant candies become increasingly hygroscopic and sticky while when the mixture contains 86% and higher maltitol the candies rapidly become opaque as a result of maltitol crystallisation.

The maltitol-containing mixture of sugar alcohols is suitably derived from a hydrogenated starch hydrolysate which is another name for hydrogenated corn syrup. Since the latter comprises glucose, maltose, maltotriose and higher glucose oligomers ($DP>3$, where "DP" refers to the degree of polymerisation i.e. the number of glucose units in the molecule) the hydrogenated product will contain sorbitol, maltitol, maltitriitol and hydrogenated oligomers of $DP>3$. Suitable maltitol containing mixtures may be made by hydrogenating the appropriate starch hydrolysate or by adding maltitol to an hydrogenated starch hydrolysate to increase its maltitol content.

The hydrogenated starch hydrolysates which are the preferred feedstocks for the process of the present invention may comprise 10 to 35% by weight water based on the weight of the mixture, most often about 30% by weight water. This feedstock is heated to an elevated temperature, until a product is obtained which preferably contains less than 5% by weight water, more preferably less than 4%, particularly 2% of less water based on the weight of the candy. Usually, at the end of the heating period a low vacuum is applied to facilitate water removal.

The process used to produce hard candies from sucrose and/or corn syrups customarily operates at a temperature of 140° to 145° C. but it is suggested in the prior art that when maltitol is the starting material it is necessary to employ higher temperatures to obtain a satisfactory product. The article by I. Fabry referred to above recommends on page 91 a temperature of at least 160° C. while in the Example 1 of U.K. patent 2 038 832 the temperature used was 170° C. European patent application 303 295 A is another document which contains a description of the preparation of a hard candy from a sugar alcohol, in this case from a mixture of erythritol and another sugar alcohol, and discloses in Example 1 that a mixture of 70% by weight erythritol and 30% by weight maltitol was heated to 160° C. to produce the hard candy.

Although at first sight the difference between 140° and 145° C. and 160° C. and above does not appear significant it does become important for the small scale producer of conventional hard candy from sugar who wishes to produce a maltitol-based hard candy is his existing equipment. The type of equipment which is widely used for the production of hard candy is commonly steam heated and the steam pressure which is sufficient to maintain the sugar at 140°–145° C. is found to be hardly adequate when a temperature of 160° C. or higher is required particularly a temperature of 168° C. to 170° C. For this reason there is a considerable advantage to a process which is capable of producing a maltitol-based hard candy at a temperature of less than 160° C. We have found that by operating in accordance with the present invention it is possible to produce an acceptable hard candy based on maltitol which may be processed at an elevated temperature below 160° C. Preferably, the process temperature is above 145° C. but less than 160° C. more preferably 150° to 158° C. especially about 155° C. At these temperatures it is preferable to apply a low vacuum, suitably 0.6 to 0.8 bar at the end of the heating period. Operation of the process according to the present invention at a temperature less than 160° C. enables a hard candy to be produced containing 2% by weight residual water, or less, which does not show significant moisture pick-up on storage. If however a sugar alcohol feedstock is used which contains 77% or less maltitol a product is obtained which although containing the same amount of residual water is hygroscopic on storage.

The maltitol-containing sugar alcohol feedstock for the present invention may also include flavour and/or colouring matter or any other additives commonly found in hard candy products. Production of the hard candies may be carried out in batch evaporators or in continuous cookers, the process, time required to achieve the elevated temperature generally being up to 15 minutes, preferably in the range 5 to 10 minutes.

The invention will now be further described with reference to the following Examples in which there was used a candy cooker provided with means to induce a vacuum. The amount of material heated in the cooker for each test was three kilos and heating was continued until the specified temperature was attained when the product was allowed to cool until its viscosity was suitable for pouring into plastic moulds where it was allowed to solidify before being discharged for evaluation. The evaluation results were as follows, all percentages being by weight of the finished candy.

| Example | Composition | Cooking Temp. | Initial water content | Final water content | Moisture pick-up after 14 days (unwrapped)* | Candy appearance wrapped | Stickiness on wrapping paper |
|---|---|---|---|---|---|---|---|
| 1 | 82% maltitol | 155° C. | 25% | 1.8% | 4.2% | clear | slight |
| 2 | 82% maltitol | 168° C. | 25% | 0.8% | 3.1% | clear | slight |
| 3 | 50% maltitol | 168° C. | 25% | 0.8% | 6.5% | clear | yes |
| 4 | 75% maltitol | 168° C. | 25% | 0.8% | >11.0% | clear | yes |
| 5 | 86% maltitol | 168° C. | 25% | 0.8% | 2.2% | cloudy | no |

*A moisture pick-up after 14 days of less than 5% is generally regarded as acceptable.

We claim:

1. A process for the production of a hard candy which comprises heating a maltitol-containing mixture of sugar alcohols at an elevated temperature, the maltitol content of the sugar alcohol mixture being more than 77% but less than 86% by weight based on dry substance.

2. A process as set forth in claim 1 in which the elevated temperature is above 145° C.

3. A process as set forth in claim 2 in which the elevated temperature is in the range 150° to 158° C.

4. A process as set forth in claim 2 in which the elevated temperature is about 155° C.

5. A process as set forth in claim 1 including the step of applying a period of low vacuum at the end of the heating.

6. A process as set forth in claim 5 in which the low vacuum is 0.6 to 0.8 bar.

7. A process as set forth in claim 1 in which the maltitol-containing mixture of sugar alcohols is a hydrogenated starch hydrolyzate to which maltitol has been added.

8. A process as set forth in claim 1 in which the maltitol content of the sugar alcohol mixture is 80 to 85% by weight based on dry substance.

9. A process as set forth in claim 8 in which the maltitol content of the sugar alcohol mixture is 82 to 84% by weight based on dry substance.

10. A process as set forth in claim 9 in which the maltitol content of the sugar alcohol mixture is 82 to 83% by weight based on dry substance.

11. A process as set forth in claim 1 in which the sugar alcohol mixture comprises 10 to 35% by weight water, based on the weight of the mixture.

12. A process as set forth in claim 1 in which the water content of the hard candy product is less than 4% by weight, based on the weight of the candy.

13. A process as set forth in claim 12 in which the water content of the hard candy product is less than 2% by weight, based on the weight of the candy.

14. A sugar alcohol mixture useful for a process for the production of a hard candy which comprises heating a maltitol-containing mixture of sugar alcohols at an elevated temperature, the maltitol content of the sugar alcohol mixture being more than 77% but less than 86% by weight maltitol based on dry substance.

15. A sugar alcohol as set forth in claim 14 in which the maltitol content of the sugar alcohol mixture is 80 to 85% by weight maltitol based on dry substance.

16. A sugar alcohol as set forth in claim 15 in which the maltitol content of the sugar alcohol mixture is 82 to 84% by weight maltitol based on dry substance.

17. A sugar alcohol as set forth in claim 16 in which the maltitol content of the sugar alcohol mixture is 82 to 83% by weight maltitol based on dry substance.

* * * * *